(No Model.)

M. L. SEVERY.
REFLECTOR FOR RADIANT ENERGY.

No. 503,004. Patented Aug. 8, 1893.

Witnesses.
D. W. Allen.
A. L. Carpenter.

Inventor.
Melvin L. Severy
by Howe & Kellogg
attys.

UNITED STATES PATENT OFFICE.

MELVIN L. SEVERY, OF BOSTON, MASSACHUSETTS, ASSIGNOR TO FRANCIS DOANE, CHARLES F. CROWELL, AND MELVIN L. SEVERY, TRUSTEES, OF SAME PLACE.

REFLECTOR FOR RADIANT ENERGY.

SPECIFICATION forming part of Letters Patent No. 503,004, dated August 8, 1893.

Application filed November 10, 1892. Serial No. 451,553. (No model.)

*To all whom it may concern:*

Be it known that I, MELVIN L. SEVERY, a citizen of the United States, residing in Boston, in the county of Suffolk and State of Massachusetts, have invented certain new and useful Improvements in Reflectors for Radiant Energy, of which the following, taken in connection with the accompanying drawings, is a specification.

This invention relates to cylindrical reflectors, such as are used in the construction of the apparatus for the utilization of solar heat described and claimed in another application for Letters Patent of the United States filed by me simultaneously with this application; and consists in constructing these reflectors of rows of parallel adjustable segments arranged side by side, substantially as hereinafter more fully set forth, whereby it is rendered possible to vary to a greater extent than heretofore the focus of any one of these segments and also to obtain an accurate cylindrical reflecting surface of any desired length.

In the application for Letters Patent before referred to, the reflector which forms the subject of the present application is shown as used for reflecting solar rays upon a heat receiver, the form of heat receiver used in the apparatus being a boiler for the generation of steam, but the use of the reflector herein described and claimed is not limited to the reflection of solar rays, and it may be used for reflecting any other form of radiant energy.

Figure 1:
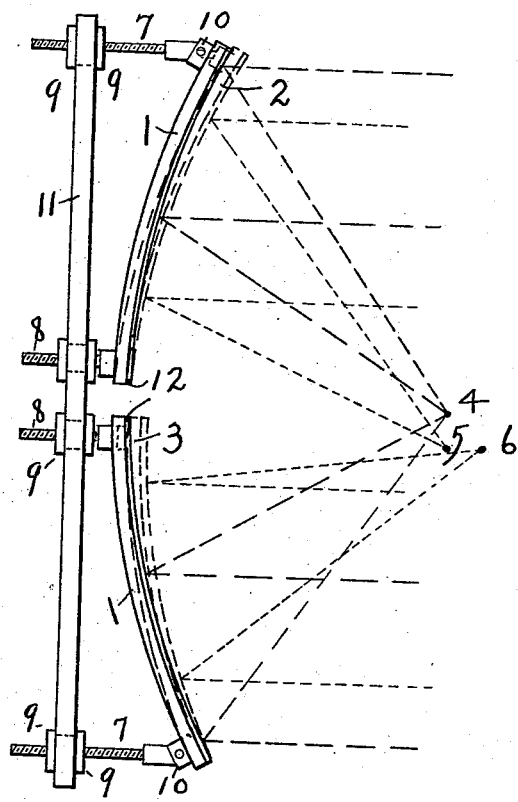
Figure 2:
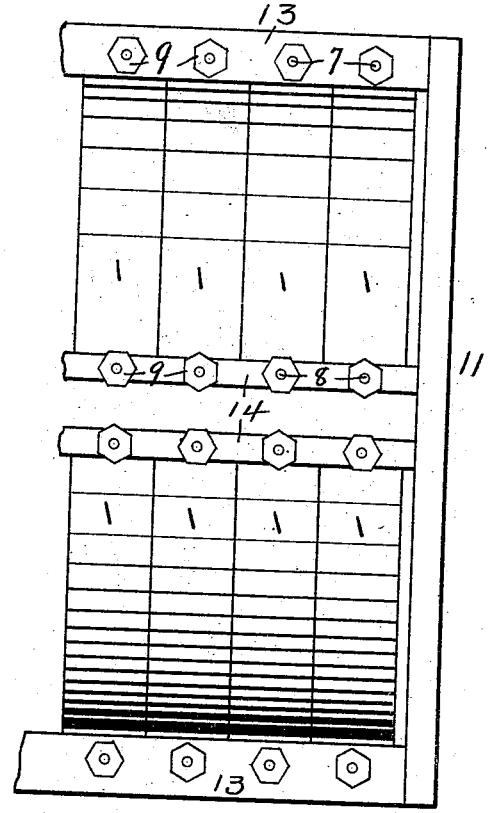
Figure 3:
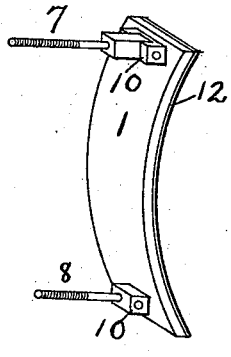

In the accompanying drawings, Figure 1 is a diagrammatical view of a reflector constructed in accordance with the principle of my invention. Fig. 2 is a view in elevation of the back of a portion of the same. Fig. 3 is a perspective view of one of the segmental plates of which the reflector is composed.

In the several figures the same numerals refer to the same parts.

Referring to the drawings, 1 is a rectangular plate of any suitable size and material, as for example metal, having the length of that side which is parallel to the longitudinal axis of the reflector considerably less than the length of the side which is parallel to a plane at right angles to this axis.

12 is a reflecting surface upon the inner face of the plate, which surface, if the plate is formed of metal, may be obtained by polishing the metal or it may be obtained by a coating of polished metal or of silvered glass. This reflecting surface is given a curvature which is preferably that of the arc of a parabola, for the reason that it is the property of a parabolic curve to bring to a common focus all parallel rays incident upon the reflecting surface, but it may have any other suitable curve as may be desired. The curvature of the reflecting surface may be obtained by bending the plates when the two surfaces are parallel, but it may also be obtained without bending by cutting away a portion from a solid block, the back surface of which need not necessarily be parallel to the front and reflecting surface.

Hinged to a block 10 on the back of the plate 1, at that end which when the plate is in position is farthest from the axis of the reflector, is a rod 7 perpendicular to a line tangent to the curved surface, and loosely fitted in another block 10 on the other end of the plate is a rod 8 parallel to the rod 7. This rod is loosely fitted in the block in order to permit a slight play of the rod in the adjustment of the plate 1.

Behind the reflector is a rectangular frame of wood, metal, or other suitable material, composed of the end bars 11, and the parallel bars 13 and 14 at right angles to the bars 11. There are two bars 14 parallel to each other and extending across the middle of the frame, and preferably separated from each other by a short space. The bars 13 form the sides of the frame, and are separated from the bars 14 by a distance about equal to the length of the segmental plate 1, so that when this plate is fixed in position the rod 7 will pass through the bar 13, and the parallel rod 8 will pass through the bar 14. On these rods is a screw thread, and on these rods on each side of the bars through which they pass is a nut 9 by means of which the rods may be moved longitudinally and held fixed after having been moved to any desired position.

The plates 1 are arranged side by side in any desired number according to the length of the reflector, and are placed in two parallel rows as shown in the drawings, and the position of the focal line of each of these plates may be varied to any desired extent by the longitudinal movement of the rods 7 and 8. This is plainly shown in Fig. 1. When the plates 1 are in the position shown in full lines, the parallel rays incident upon the reflecting surface are focused at the point 4, but when the rod 7 is moved so as to bring the upper plate 1 into the position shown in dotted lines, the parallel rays incident upon the reflecting surface will be focused at 5; and when the rod 8 is moved so as to bring the lower plate 1 into the position shown in dotted lines, the parallel rays incident upon the reflecting surface will be focused at the point 6. The position of the focal line of the different plates can thus be varied at will so as to change their respective foci, or the plates can be so adjusted that each will have exactly the same focus and thus the respective foci will be upon a straight line.

The frame behind the reflector, instead of being made of bars at right angles to each other as shown, may consist of a series of parallel rods at right angles to the longitudinal axis of the reflector, or it may be an entire flat plate.

Having thus described my invention, what I claim, and desire to secure by Letters Patent of the United States, is—

A reflector composed of substantially parallel rows of segments, the segments in each row being arranged side by side and also individually and independently adjustable to vary the position of its focus, and means for varying the position of the segments comprising a frame, and two rods 7, 8 supporting and pivotally connected with each segment and movably secured to the frame, substantially as shown and described.

In testimony whereof I have hereunto subscribed my name this 7th day of November, A. D. 1892.

MELVIN L. SEVERY.

Witnesses:
D. W. ALLEN,
CHAS. A. KELLOGG.